(No Model.)
J. P. ALLEN.
Seed Planter and Guano Distributer.
No. 236,528.          Patented Jan. 11, 1881.
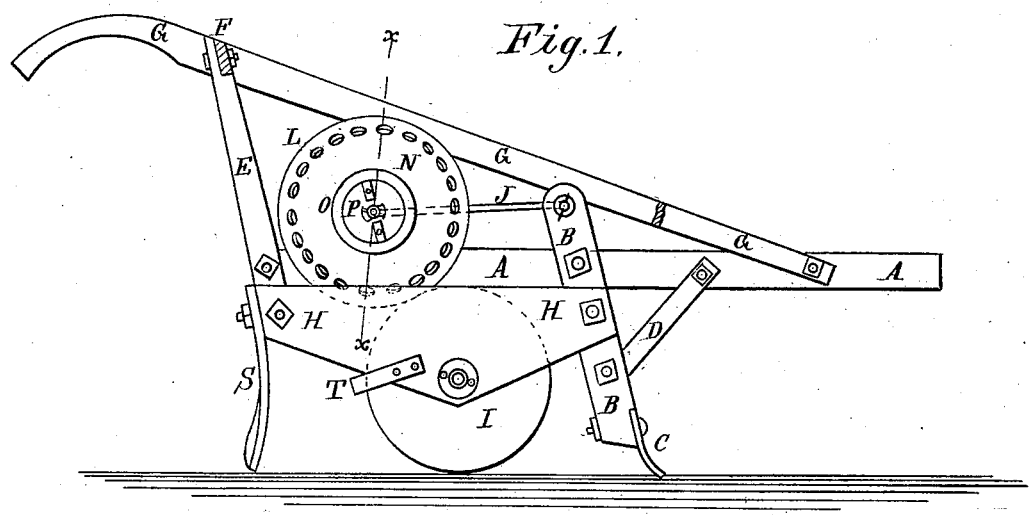
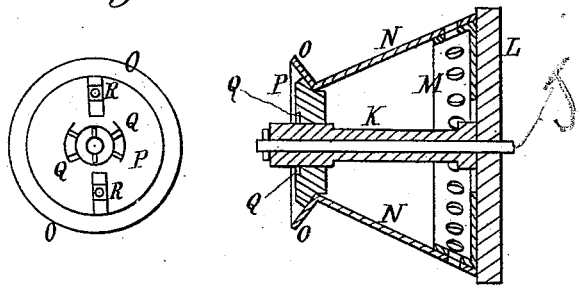
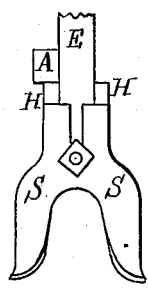
WITNESSES:
Henry N. Miller
C. Sedgwick
INVENTOR:
J. P. Allen
BY Munn & Co.
ATTORNEYS.
N. PETERS, PHOTO-LITHOGRAPHER, WASHINGTON, D. C.

UNITED STATES PATENT OFFICE.

JOHN P. ALLEN, OF DAWSON, GEORGIA.

SEED-PLANTER AND GUANO-DISTRIBUTER.

SPECIFICATION forming part of Letters Patent No. 236,528, dated January 11, 1881.

Application filed June 12, 1880. (No model.)

*To all whom it may concern:*

Be it known that I, JOHN P. ALLEN, of Dawson, in the county of Terrell and State of Georgia, have invented a new and useful Improvement in Seed-Planters and Guano-Distributers, of which the following is a specification.

Figure 1 is a side elevation of the improvement. Fig. 2 is a sectional elevation of the seed-drum, taken through the line $x\ x$, Fig. 1. Fig. 3 is an end elevation of the seed-drum. Fig. 4 is a rear elevation of the covering-plow.

The object of this invention is to furnish machines so constructed that they will distribute cotton-seed, corn, pease, and other seeds and grain, and guano and other fine fertilizers, in drills uniformly, and in greater or less quantity, as may be desired, and which shall be simple in construction, inexpensive in manufacture, strong, and durable.

Similar letters of reference indicate corresponding parts.

A is the plow-beam, to the side of the middle part of which is attached the standard B. To the lower end of the standard B is attached a shovel-plow, C, to open a furrow to receive the seed or fertilizer. The upper end of the standard B projects a little above the beam A, and the draft-strain upon the said standard is sustained by an inclined brace, D, attached to its lower part and to the said beam A, as shown in Fig. 1.

To the side of the rear end of the beam A is attached upright E, the lower end of which projects below the said beam, and to its upper end is attached the center of the cross-bar F.

To the ends of the cross-bar F are attached the rear parts of the handles G, the forward ends of which are attached to the opposite sides of the forward part of the beam A.

To the opposite sides of downwardly-projecting end of the upright E and to the opposite sides of the standard B are attached the ends of two parallel bars, H, in such positions as to be just below the beam A.

To and between the lower forward parts of the bars H is pivoted a wheel, I, in such a position as to roll along the bottom of the furrow opened by the plow C and be revolved by contact with the ground.

J is a rod, the forward end of which is bent at right angles, is passed through a hole in the upwardly-projecting end of the standard B, and is secured in place by a pin and washer. The rear part of the rod J is bent at right angles, and is passed through the long hub K, which is secured in place upon it by a pin and washer.

To the inner end of the hub K is attached a wheel, L, the face of which rests upon the face of the wheel I, so as to be revolved by the revolution of the said wheel I. The rod J is made of such a length that the wheel L will overhang the rear part of the wheel I while resting upon its face.

To the side of the wheel L is attached a tapered ring-flange, M, which has a circle of equidistant holes formed through it.

N is a conical or tapered drum, the larger end of which fits upon the ring-flange M, and is perforated with a circle of holes corresponding in size, number, and distance apart with the holes in the said ring-flange M.

Around the smaller end of the drum N is formed, or to it is attached, a flaring ring-flange, O, for convenience in putting in seed or a fertilizer and inserting the cover P. The cover P fits into the smaller end of the drum N, and has a hole formed through its center of such a size as to receive and fit upon the outer end of the hub K.

In the cover P, at the opposite sides of the hole through its center, are formed two notches to receive the pins Q, attached to the opposite sides of the outer end of the hub K. In the outer side of the cover P, at the opposite sides of the hole through it, are formed inclined rabbets to receive the pins Q, so that by partially turning the cover P the hub K, wheel L, flange M, drum N, and cover P will be drawn snugly together and firmly locked in place.

To the outer side of the cover P are attached buttons or cleats R, to serve as handles for convenience in putting on and taking off the said cover.

The drum N is supplied with seed or a fertilizer by turning the machine down upon its side, removing the cover P, pouring in the seed or fertilizer, and replacing the cover.

With this construction, as the machine is drawn forward, the drum N is revolved by the revolution of the wheel I, and the seed escapes through the holes in the flange M and drum N and drops to the ground in plain view of the plowman while falling and while lying upon the ground, so that the plowman can see at any time whether the machine is working properly. The machine is adjusted to distribute more or less seed or fertilizer by adjusting the drum N upon the flange M, so that the discharge-holes may be fully uncovered or may be covered to a greater or less extent. The machine may be prepared for use as a planter by forming one or more holes in the space between the other holes, so that when the said drum is adjusted to bring these holes opposite holes in the flange M all the other holes will be closed. The furrow is opened by the plow C, is filled, and the seed covered by the forked coverer S, the arms of which are slightly twisted to give them a suitable shape. The shank of the coverer S is slotted longitudinally to receive the bolt that secures it to the rear side of the lower end of the upright E, so that the said coverer can be readily adjusted to cover the seed to a greater or less depth, as may be required.

To the lower part of the bars H are attached the arms of a U-shaped bar, T, in such a position that its bend may scrape off any soil that may adhere to the rim of the wheel I, and thus keep the said wheel clean.

I am aware that conical seed-boxes are not broadly new; but

What I claim as new is—

1. The combination, with the wheel L, arranged on hub K, of the apertured and tapered ring-flange M and the perforated conical drum N, fitting upon said flange M, having itself a flaring flange, O, and provided with a cover, P, as and for the purpose set forth.

2. The combination, in a seed-planter, of the notched cover P, having inclined rabbets, and the hub K, having pins Q, to hold the parts K L M N P together, as described.

JOHN PRICE ALLEN.

Witnesses:
J. L. JANES,
JAMES G. PARKS.